United States Patent
Ha et al.

(10) Patent No.: US 11,419,072 B2
(45) Date of Patent: Aug. 16, 2022

(54) METHOD FOR PROCESSING A PACKET IN A TIME-SYNCHRONIZED NETWORK AND NETWORK ELEMENT FOR PROCESSING A PACKET IN A NETWORK

(71) Applicant: ELECTRONICS AND TELECOMMUNICATIONS RESEARCH INSTITUTE, Daejeon (KR)

(72) Inventors: Jeoung Lak Ha, Daejeon (KR); Yoo Hwa Kang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 235 days.

(21) Appl. No.: 16/800,060

(22) Filed: Feb. 25, 2020

(65) Prior Publication Data
US 2020/0329441 A1   Oct. 15, 2020

(30) Foreign Application Priority Data

Feb. 26, 2019  (KR) .................. 10-2019-0022570
Feb. 5, 2020   (KR) .................. 10-2020-0013558

(51) Int. Cl.
*H04L 43/106*   (2022.01)
*H04W 56/00*   (2009.01)
*H04L 69/22*   (2022.01)
*H04J 3/06*    (2006.01)

(52) U.S. Cl.
CPC .......... *H04W 56/001* (2013.01); *H04J 3/067* (2013.01); *H04L 43/106* (2013.01); *H04L 69/22* (2013.01); *H04J 3/0667* (2013.01)

(58) Field of Classification Search
CPC ... H04L 69/161; H04L 69/22; H04L 12/1895; H04L 43/106; H04J 3/0667; H04J 3/067
See application file for complete search history.

(56) References Cited

U.S. PATENT DOCUMENTS

| | | |
|---|---|---|
| 2011/0090840 A1 | 4/2011 | Lee et al. |
| 2018/0309655 A1 | 10/2018 | Joseph et al. |
| 2019/0104073 A1 | 4/2019 | Choi et al. |
| 2019/0132251 A1* | 5/2019 | Dao ................. H04W 28/0231 |
| 2020/0228220 A1* | 7/2020 | Joseph ................ H04J 3/0697 |
| 2020/0259896 A1* | 8/2020 | Sachs ............... G06K 19/06037 |
| 2021/0092792 A1* | 3/2021 | Li ....................... H04L 67/562 |
| 2021/0243771 A1* | 8/2021 | Mannweiler ...... H04W 28/0268 |
| 2021/0306901 A1* | 9/2021 | Mannweiler ........... H04L 45/02 |
| 2022/0022088 A1* | 1/2022 | Gebert ............. H04W 28/0268 |

* cited by examiner

*Primary Examiner* — Salvador E Rivas
(74) *Attorney, Agent, or Firm* — LRK Patent Law Firm

(57) ABSTRACT

A method for processing a packet in a mobile communication network and a network element for performing the same. A first network element may receive a first data packet to be transmitted to a second network element via a third network element and add a header to the first data packet. The first network element may add time information associated with the first data packet to the header and transmit the first data packet with the header to the third network element.

13 Claims, 14 Drawing Sheets

METHOD FOR PROCESSING A PACKET IN A TIME-SYNCHRONIZED NETWORK AND NETWORK ELEMENT FOR PROCESSING A PACKET IN A NETWORK

CROSS-REFERENCE TO RELATED APPLICATION

This application claims priority to and the benefit of Korean Patent Application No. 10-2019-0022570 filed in the Korean Intellectual Property Office on Feb. 26, 2019, and Korean Patent Application No. 10-2020-0013558 filed in the Korean Intellectual Property Office on Feb. 5, 2020, the entire contents of which are incorporated herein by reference.

BACKGROUND OF THE INVENTION

1. Field of the Invention

The present invention relates to a method for processing a packet in a mobile communication network and a network element for performing the same, and more particularly, to a method for processing a packet related to time sensitive data and a network element performing the same.

2. Description of Related Art

The IEEE 802.1 Group has established and is improving the 802.1Q-218 Time Sensitive Networking (TSN) standard for delivering time sensitive data. TSN technology provides deterministic services of low latency, low delay variation, and low packet loss based on data link layer of ISO OSI (Open Systems Interconnection) seven layer model, e.g. Ethernet.

As bridges within a network are time-synchronized and process traffic through scheduling based on the synchronized time, TSN technology is a time-deterministic transmission technology that guarantees the maximum delay in the network.

Meanwhile, in order to support transmission of TSN data through 5G, 3GPP considers a 5G network as a bridge or a link of a TSN system and studies a method of transmitting data of the TSN system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for effectively processing a packet related to time sensitive data in a mobile communication network and a network element for performing the same.

According to an exemplary embodiment of the present invention, a method for processing a packet in a time-synchronized network may be provided. The method may include receiving, by a first network element, a first data packet to be transmitted to a second network element via a third network element, adding, by the first network element, a header to the first data packet, adding, by the first network element, time information associated with the first data packet to the header, and transmitting, by the first network element, the first data packet with the header to the third network element.

The time information may include at least one of a first time when the first network element receives the first data packet, a second time when the third network element should receive the first data packet, and a third time when the first data packet should be delivered to the second network element.

The third network element may calculate a time spent passing from the first network element to the third network element by using a difference between a time when the first network receives the first data packet and a time when the third network element transmits the first data packet.

The header may be a general packet radio service tunneling protocol (GTP) header or a service data adaptation protocol (SDAP) header.

The adding the first time information may include creating, by the first network element, an extension indicating a time in the GTP header and recording the time information in the extension.

The first data packet may include a time sensitive data frame to be transmitted at a data link layer using one of an Ethernet frame and an unstructured frame.

The time sensitive data frame may be of a Network timing protocol, such as PTP (Precision Time Protocol).

The third time may be represented using a minimum time at which the first data packet should be delivered to the second network element and a maximum time at which the first data packet should be delivered to the second network element.

The third time may be represented using a minimum time that a network can occupy for delivering the first data packet to the second network element and a maximum time that a network can occupy for delivering the first data packet to the second network element.

The first to third times may be one of a natural time and an epoch time.

The first network element may be a NW-TT (network TSN (time sensitive networking) translator) or a UPF (user plane function), the third network element may be user equipment or a DS-TT (device side TSN translator), and the second network element may be a TSN end station.

The first network element may be a DS-TT (device side TSN (time sensitive networking) translator) or user equipment, the third network element may be a UPF (user plane function) or a NW-TT (network TSN translator), and the second network element may be a TSN end station.

The third network element my put the spent time into a correction field of a precision time protocol (PTP)

According to another exemplary embodiment of the present invention, a method for processing a packet in a time-synchronized network may be provided. The method may include receiving, by the first network element, a data packet including time information associated with the data packet to be delivered to a second network element via a third network element, determining, by the first network element, using the time information on whether the data packet can be delivered to the second network within a first time to be delivered to the second network, removing, by the first network element, a header including the time information, and transmitting, by the first network element, the data packet from which the header has been removed to the third network element.

The method may further include discarding, by the first network element, the first data packet when the first network element determines that the data packet cannot be delivered within the first time in the determining.

The method may further include delaying, by the first network element, the first data packet when the first network element determines that the data packet can be delivered within the first time in the determining.

The header may be a general packet radio service tunneling protocol (GTP) header or a service data adaptation protocol (SDAP) header.

According to another exemplary embodiment of the present invention, a first network element for processing a packet in a network may be provided. The first network element may include a network interface configured to receive a first data packet to be transmitted to a second network element via a third network element, and a processor configured to add a header including time information associated with the first data packet to the first data packet and control transmitting the first data packet with the header to the third network element.

The time information may include at least one of a first time when the first network element receives the first data packet, a second time when the third network element should receive the first data packet, and a third time when the first data packet should be delivered to the second network element.

The header may be a general packet radio service tunneling protocol (GTP) header or a service data adaptation protocol (SDAP) header.

According to an exemplary embodiment of the present invention, by inserting time information on time sensitive data for TSN into a header, the corresponding data may be delivered within a required time.

DETAILED DESCRIPTION OF THE EMBODIMENTS

Figure 1:
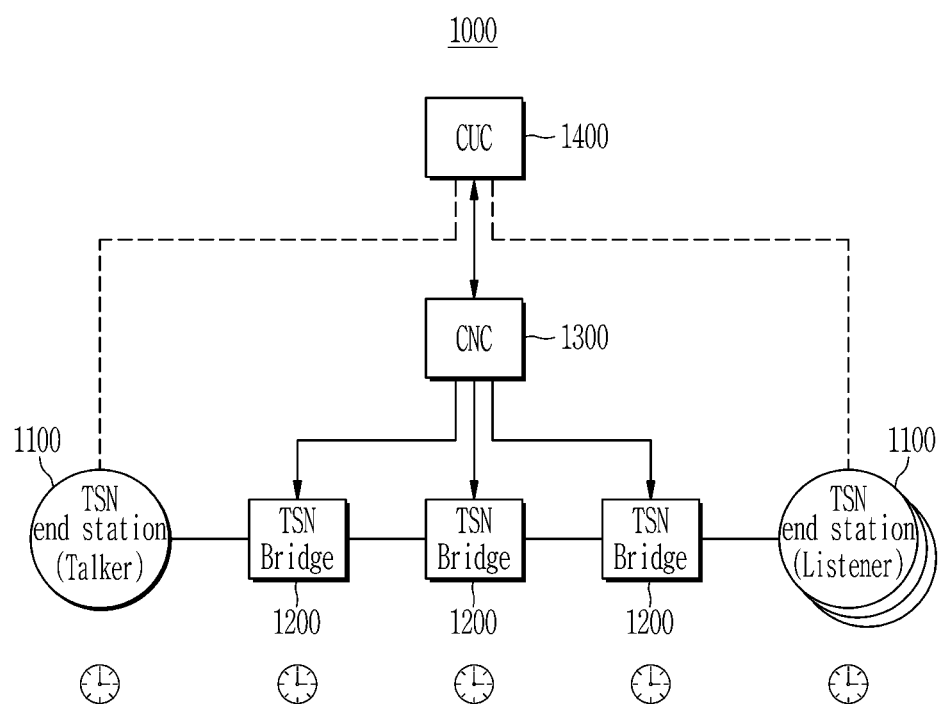
FIG. 1 is a diagram showing a centralized TSN system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, user equipment (UE) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the terminal, the MT, the AMS, the HR-MS, the SS, the PSS, the AT, or the like.

In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the BS, the ABS, the nodeB, the eNodeB, the BTS, the MMR-BS, the RS, the HR-RS, and the like.

FIG. 1 is a diagram showing a centralized TSN system 1000 according to an exemplary embodiment of the present invention.

As shown in FIG. 1, the TSN system 1000 according to an exemplary embodiment of the present invention includes a plurality of TSN end stations 1100, a plurality of TSN bridges 1200, and a centralized network configuration (CNC) 1300, and a centralized user configuration (CUC) 1400. The TSN system 1000 shown in FIG. 1 is a network for processing time sensitive data in a data link layer.

The plurality of TSN end stations 1100 may be divided into talkers and listeners, and are end devices that transmit and receive time sensitive data in the TSN system.

The CNC 1300 serves as a network administrator within the TSN system. The CNC 1300 defines scheduling for time sensitive data with the TSN bridge 1200 and the TSN end station 1100 so that TSN data frames can be passed through the TSN bridge 1200 to the TSN end station 1100 in time.

The CUC 1400 communicates with the TSN end station 1100 and the CNC 1300. The CUC 1400 receives a time sensitive processing request for a specific stream from the TSN end station 1100 and forwards it to the CNC 1300.

The CNC 1300 and the CUC 1400 may be selectively applied according to the configuration of the TSN system. Through the form of a command from the CNC 1300/CUC 1400 or a separate method, a control protocol of the TSN system sets identifiers and requirements for time sensitive data to TSN bridges 1200 and TSN end stations 1100. The control protocol of the TSN system sets the time period during which the TSN bridges 1200 and the TSN end stations 1100 operate.

Meanwhile, the times of the TSN end stations 1100 and the TSN bridges 1200 in the TSN system 1000 may be synchronized through a protocol such as IEEE 1588.

Figure 2:
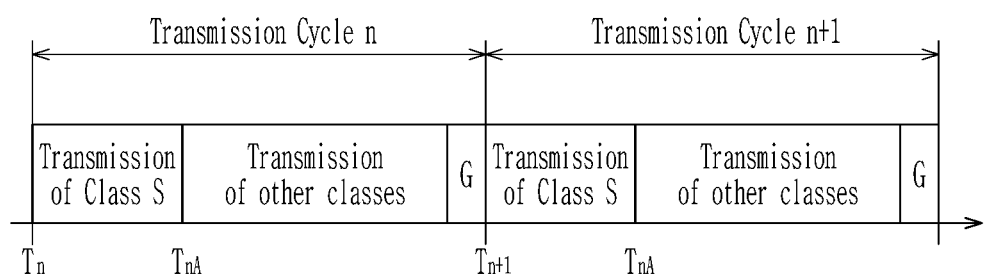
FIG. 2 is a diagram showing a time sensitive schedule of the TSN system according to an exemplary embodiment of the present invention.

FIG. 2 is a diagram showing a time sensitive schedule of the TSN system according to an exemplary embodiment of the present invention.

Conventional Ethernet protocol detects a collision after transmitting data and retransmits it after a random time when a collision occurs by using CSMA/CD. In contrast, the TSN system divides the time into a certain cycle and allocates a certain period within the cycle for the time sensitive data to transmit the time sensitive data. This allows the time sensitive data to be sent every cycle.

In FIG. 2, a class S indicates a class of time sensitive data, and G indicates a guard time. Through such scheduling, data other than the time sensitive data may not invade the time sensitive data.

Whether a specific stream is the time sensitive data may be determined by a stream identifier (ID) and a priority. Here, the stream ID and the priority may be determined by combining a destination MAC address and a virtual local area network (VLAN) ID or by combining a source MAC address and the VLAN ID as described in FIG. 5. If the specific stream is determined as the time sensitive data, the specific stream is the class S. The TSN bridge 1200 and the TSN end station 1100 schedule the time sensitive data and non-time sensitive data as shown in FIG. 2.

An exemplary embodiment of the present invention adds time information on the time sensitive data to a layer protocol of Layer 3 (L3) or higher, which is an upper layer of the data link layer, which will be described in more detail below.

Figure 3:
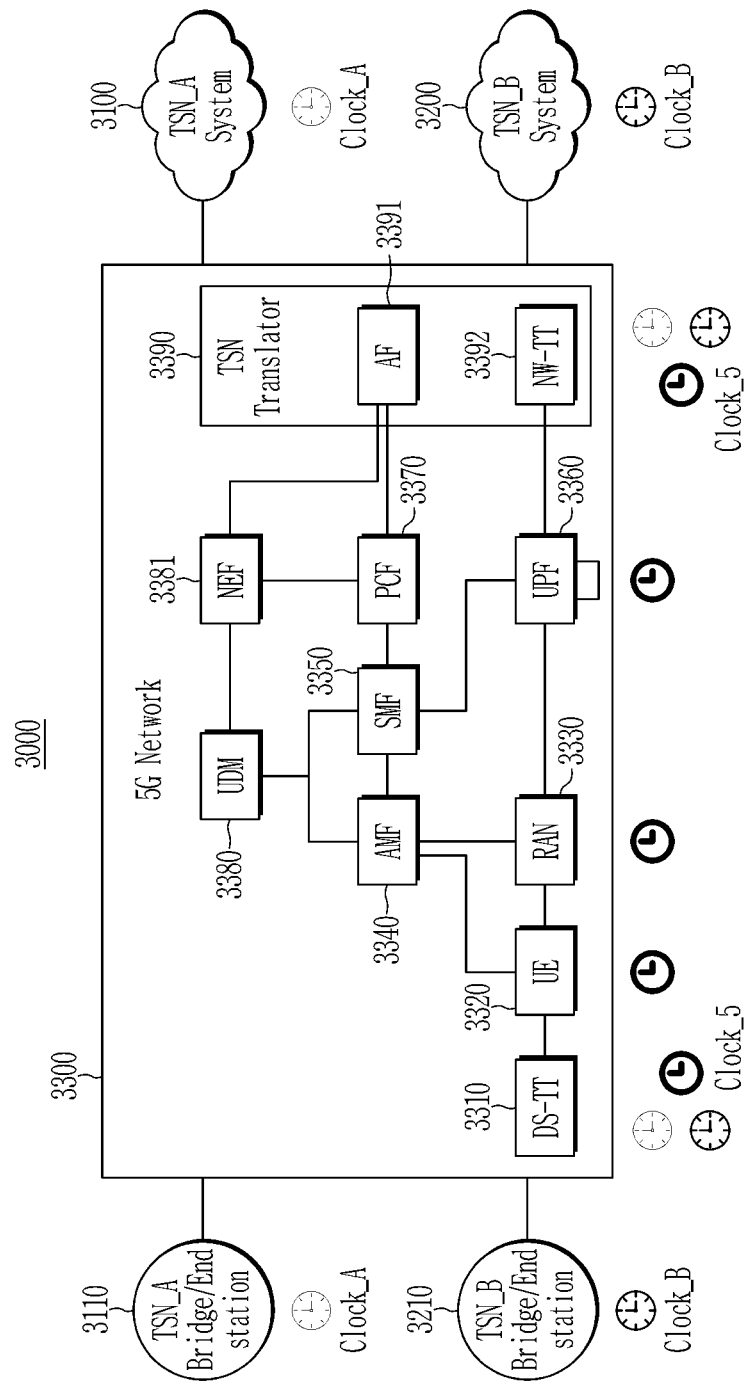
FIG. 3 is a diagram showing interworking between a TSN system and a 5G network according to an exemplary embodiment of the present invention.

FIG. 3 is a diagram showing interworking between a TSN system and a 5G network according to an exemplary embodiment of the present invention. That is, FIG. 3 shows a case of using a 5G network as the TSN bridge or link between the TSN bridges of FIG. 1.

When a 5G network is inserted as the TSN bridge or link in the middle of the TSN system, a translator for the TSN is required on both sides of the 5G network. FIG. 3 shows an example in which one 5G network 3300 is connected to two TSN systems. The TSN system largely includes a TSN_A system 3100 and a TSN_B system 3200. The TSN_A system 3100 and the TSN_B system 3200 may be the TSN system described with reference to FIG. 1. A TSN_A bridge/end station 3110 is included in the TSN_A system 3100, and the TSN_A system 3100 is synchronized to a clock A (Clock_A). A TSN_B bridge/end station 3210 is included in the TSN_B system 3200, and the TSN_B system 3200 is synchronized to a clock B (Clock_B).

As shown in FIG. 3, the TSN_A bridge/end station 3110 to be connected to the TSN_A system 3100 and the TSN_B bridge/end station 3210 to be connected to the TSN_B system 3200 are each connected to the 5G network 3300.

An application function (AF) 3391 receives a requirement for time sensitive data processing for a specific stream through control protocols from the TSN_A system 3100 and the TSN_B system 3200. The AF 3391 transmits a stream ID, a bandwidth, a maximum frame size, a frame period, and the like for the specific stream to the 5G network 3300 so that the 5G network 3300 may process the time sensitive data. Here, the AF 3391 may be replaced with the term TSN control plane (CP) translator.

A network TSN translator (NW-TT) 3392 performs conversion between the 5G network 3300 and the TSN system 3100 or 3200 for the time sensitive date frame as illustrated in FIG. 2. The NW-TT 3392 may exist inside a user plane function (UPF) 3360 or may exist independently of the outside of the UPF 3360. Since the 5G network 3300 adopts a packet processing method of an IP layer or more, and the TSN systems 3100 and 3200 adopt a frame processing method in the data link layer, the NW-TT 3392 performs conversion for different layers. In an exemplary embodiment of the present invention, time information described below is added to TSN-related data. For example, the time information may be reception time information (time information at which a node in a 5G network has received TSN related data), transmission time information (transmission time information between nodes in a 5G network), or delivery request time information of time sensitive data.

The UE 3320 is connected to the TSN end stations 3110 and 3210, and UE 3320 is connected to the TSN end stations 3110 and 3210 through a device side TSN translator (DS-TT) 3310. Here, for the UE belonging to the 5G network 3300, the DS-TT 3310 may perform conversion for traffic to/from the TSN system and further perform conversion for the control. This DS-TT 3310 has a similar role to the roles of the AF 3391 and the NW-TT 3392. The DS-TT 3310 may exist inside the UE 3320 or independently of the outside of the UE 3320.

A radio access network (RAN) 3330 performs radio access to moving UE 3320. The user plane function (UPF) 3360 performs processing on user data, and serves as an anchor of the UE 3320 to the TSN system when the user moves to a range where the UPF 3360 changes. Here, one or more UPFs may be added between the anchor UPF and the RAN. A network exposure function (NEF) 3381 informs of the 5G network function to the AFs 3391 for TSN systems 3100 and 3200, through which the TSN systems 3100 and 3200 may use the 5G network 3300. Meanwhile, the NEF 3381 receives from the AF 3391 a requirement regarding time sensitive packet processing from the TSN systems 3100 and 3200. The NEF 3381 transmits the requirement to a PCF 3370.

The policy control function (PCF) 3370 determines whether the UE 3320 connected to the TSN end stations 3110 and 3210 can handle the requirements for processing the time sensitive packet within the 5G network, and informs a session management function (SMF) 3350 of the determined result. The UDM 3380 informs the SMF 3350 of whether the UE 3320 connected to the TSN end stations 3110 and 3210 can receive the corresponding time sensitive packet processing service in the 5G network and the related information. An access and mobility management function (AMF) 3340 allows the UE 3320 connected to the TSN end stations 3110 and 3210 to access the 5G network. The SMF 3350 allows the UE 3320 connected to the TSN end stations 3110 and 3210 to establish a session for time sensitive packet processing in the 5G network.

The 5G network 3300 is internally time-synchronized to a clock (Clock_5) in order to deliver time sensitive packet from the TSN systems 3100 and 3200. Here, the clock (Clock_5) is a synchronization clock in the 5G network 3300, and may be managed by being converted and mapped with time information of clock A (Clock_A) and clock B (Clock_B), which are times of each TSN system. Here, time synchronization mapping between the 5G network 3300 and the TSN systems 3100 and 3200 may be performed using one of the NW-TT 3392 and the AF 3391. Each clock A (Clock_A) is synchronized with each other across the 5G network 3300, and a precision time protocol (PTP) or the like may be used for this synchronization. When the clock information received from the TSN systems 3100 and 3200 is transferred to the TSN end stations 3110 and 3210, the clock information is corrected by measuring the residence time required to pass through the 5G network 3300 and calculating clock drift ratio between 5G clock (Clock-5) and TSN clock (Clock_A or Clock_B). Through this, an error between both clock As (Clock_A) can be reduced. This clock synchronization method may be equally applied to both clock Bs (Clock_B) having a 5G network 3300 therebetween.

Here, the indication of the synchronized time may be a natural time including the year, month, day, hour, minute, millisecond, microsecond, and nanosecond. In addition, the indication of the synchronized time may be expressed in the form of epoch time expressed as the number of clock ticks that have elapsed since a specific reference time point. The resolution of the nanosecond in natural time or the number of clock ticks in epoch time may be used differently depending on the accuracy of the clock. Meanwhile, the synchronization of time may be directly expressed by the natural time or epoch time of the devices to be synchronized. The synchronization of time may be managed by the relative time of each device with respect to a reference time expressed as a natural time or an epoch time of one device.

Meanwhile, each element (for example, a TSN end station, a TSN bridge, each element of the 5G network, etc.) described in FIG. 1 and FIG. 3 may be replaced with the term "network element".

Figure 4:
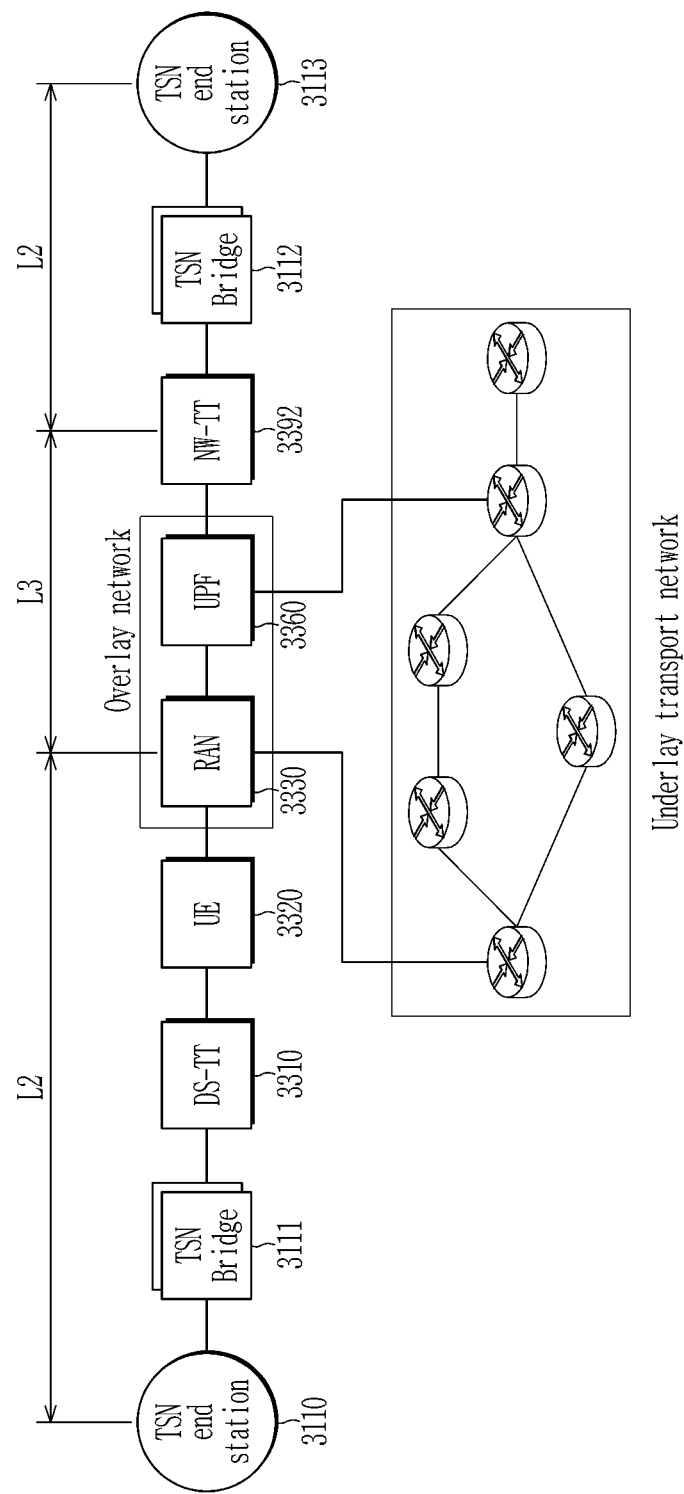
FIG. 4 is a diagram showing an interworking structure between a TSN system and a 5G network according to an exemplary embodiment of the present invention.

FIG. 4 is a diagram showing an interworking structure between a TSN system and a 5G network according to an exemplary embodiment of the present invention.

As shown in FIG. 4, when the TSN end station 3110 and a TSN end station 3113 in one TSN system wish to perform TSN communication through the 5G network 3300, the TSN end station 3110 is connected to the DS-TT directly or through one or more TSN bridges 3111. The DS-TT 3310 is connected to or included in the UE 3320. The TSN end station 3113 is connected to the NW-TT 3392 directly or through one or more TSN bridges 3112, and the NW-TT 3392 is connected to or included in the UPF 3360.

The UE 3320 and the RAN 3330 are connected to each other by wireless communication, and the RAN 3330 and the UPF 3360 form an overlay network connected through a transport network at the bottom. Between the TSN end station 3110 and the TSN bridge 3111, between the TSN bridge 3111 and the DS-TT 3310, between the NW-TT 3392 and the TSN bridge 3112, and between the TSN bridge 3112 and the TSN end station 3113, the time sensitive communication method may be implemented in the data link layer L2. Between the DS-TT 3310 and the UE 3320, and between the UE 3320 and the RAN 3330, the time sensitive communication method may be implemented in the data link layer L2

On the other hand, since the communication between the RAN 3330 and the UPF 3360 and between the UPF 3360 and the NW-TT 3392 may be performed over the network layer L3, the time sensitive processing as shown in FIG. 2 is impossible. Accordingly, control of time information is necessary.

Meanwhile, the processing in the L2 layer may specify the time, but the communication in the L3 layer may not specify the time, so in the L3 layer, a method of defining a minimum/maximum value of time may be used. In other words, Dmin5 and DMax5 represent the minimum duration and the maximum duration for the delay time of the time sensitive packet transmitted between the RAN 3330 and the UPF 3360 and between the UPF 3360 and the NW-TT 3392, respectively. An uplink transmission time to the RAN 3330, the UPF 3360, and the NW-TT 3392 may be represented by Dmin5u and DMax5u, and a downlink transmission time to the NW-TT 3392, the UPF 3360, and the RAN 3330 may be represented by Dmin5d and DMax5d. Here, Dmin5 and DMax5 are used to indicate without distinguishing uplink and downlink.

Each time sensitive stream has a requirement to be passed between the minimum transmission time DminT and the maximum transmission time DMaxT from the TSN end station 3110 to the TSN end station 3113. This requirement is transmitted to the NW-TT 3392 and the DS-TT 3310 via the control protocol.

Meanwhile, to check the information on the transmission time (the time spent passing) between the NW-TT 3392 and the DS-TT 3310, the NW-TT 3392 may record the time when the time sensitive packet is received and the DS-TT 3310 may record the time when the time sensitive packet is sent. In addition, the DS-TT 3310 may record the time when the time sensitive packet is received, and the NW-TT 3392 may record the time when the time sensitive packet is sent. With such a record, the transmission time in the 5G network may be measured.

Figure 5:
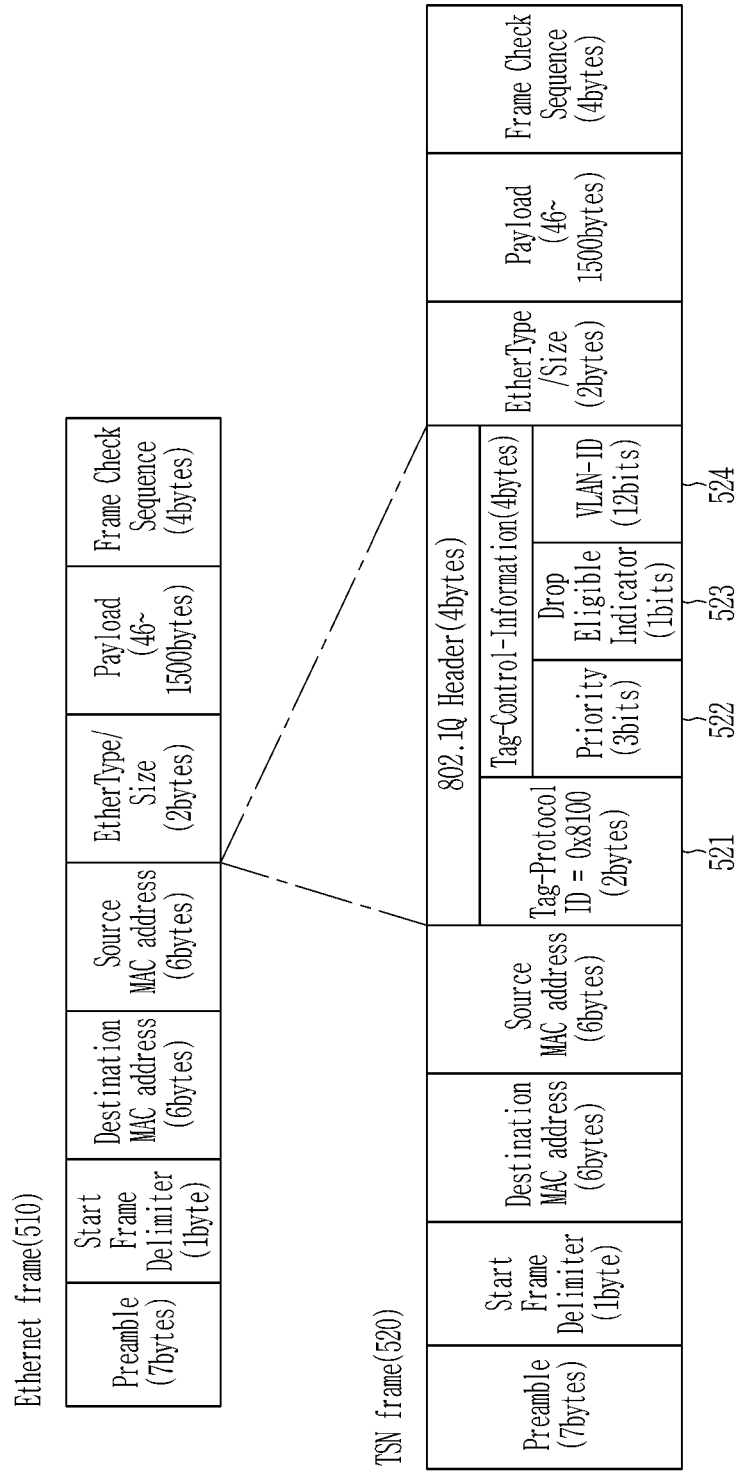
FIG. 5 is a diagram showing a TSN frame according to an exemplary embodiment of the present invention.

FIG. 5 is a diagram showing a TSN frame according to an exemplary embodiment of the present invention.

As shown in FIG. 5, a TSN frame 520 basically uses an Ethernet frame 510, and further includes an 802.1Q header. A preamble for frame time synchronization and a start frame delimiter (SFD) for frame division are located in front, and a destination MAC Address and a source MAC Address are next. The TSN frame 520 includes an Ether Type/Size indicating a type or size of a frame, user data (Payload), and a frame check sequence for error control.

The 802.1Q header added for the TSN includes a protocol ID (for example, 0x8100) 521 which is a unique value identifying the 802.1Q header, a priority 522 indicating the priority of the frame, a drop eligible indicator 523 indicating whether the frame can be discarded, and a virtual LAN identifier (VLAN-ID) 524.

Figure 6:
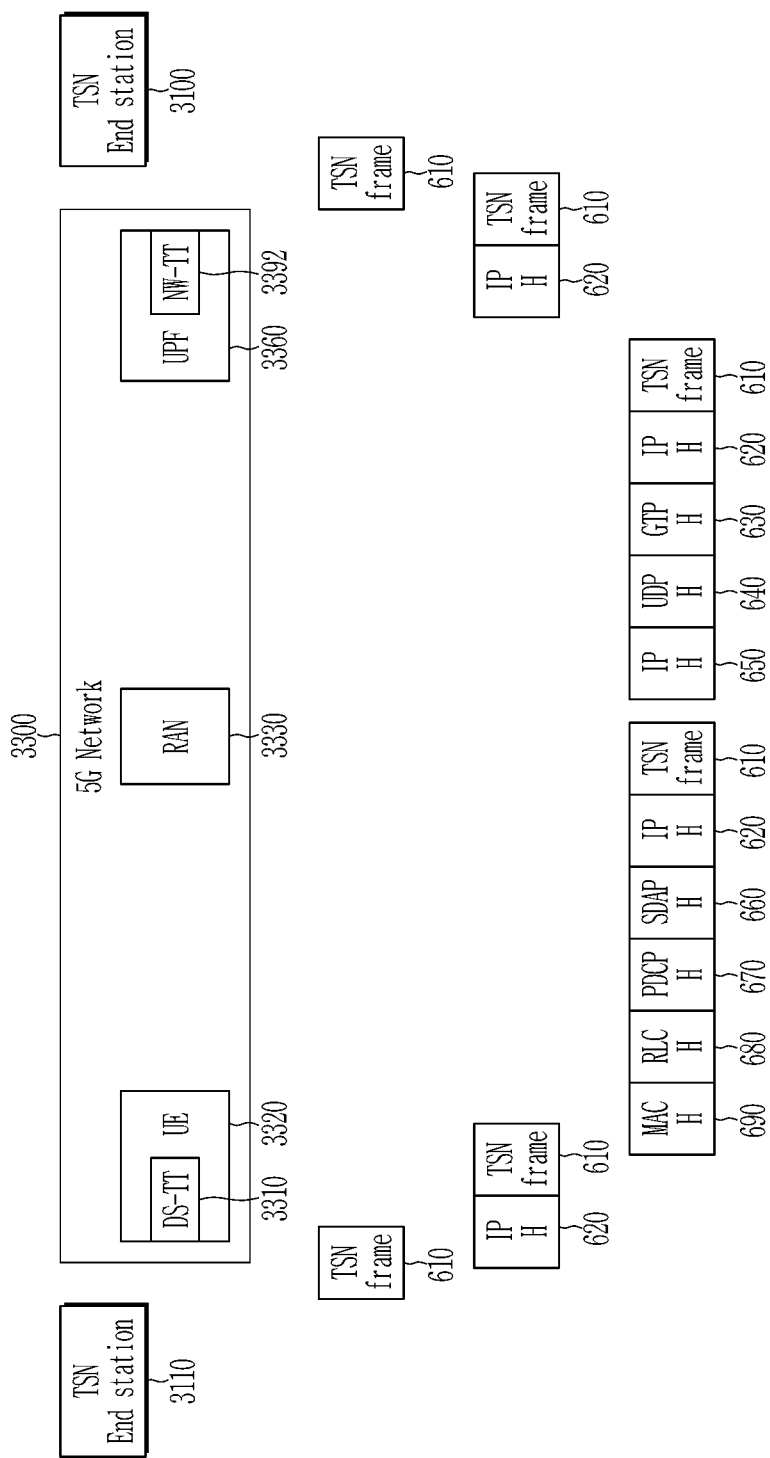
FIG. 6 is a diagram showing addition and deletion of a header for adding time information according to an exemplary embodiment of the present invention.

FIG. 6 is a diagram showing addition and deletion of a header for adding time information according to an exemplary embodiment of the present invention.

The TSN frame 520 of FIG. 5 is used between the TSN system 3100 and the 5G network 3300. The TSN frame according to the exemplary embodiment of the present invention is data for time sensitive networking, and includes data for Network timing protocol such as PTP, time sensitive information including sensing information or actuating information, and control data. The 5G network 3300 regards a data frame of time sensitive network as an Ethernet frame or an unstructured frame. From the perspective of the 5G network 3300, both the TSN frame and the unstructured frame are considered as user data.

First, in terms of downlink data, the NW-TT 3392 receives a TSN frame 610 transmitted from the TSN system 3100 to the 5G network 3300. The NW-TT 3332 adds an IP header 620 to the TSN frame 610 to generate a packet. Here, the IP header 620 indicates that the NW-TT 3392 or the UPF 3360 is the sender and the UE 3320 is the receiver.

The UPF 3360 adds a general packet radio service tunneling protocol (GTP) header 630, a user datagram protocol (UDP) header 640, and an external IP header 650. Here, the external IP header 650 indicates that the UPF 3360 is the sender and the RAN 3330 is the receiver.

The RAN 3330 removes the received external IP header 650, the UDP header 640, and the GTP header 630, and adds a service data adaptation protocol (SDAP) header 660, a packet data convergence protocol (PDCP) header 670, a radio link control (RLC) header 680, and a medium access control (MAC) header 690 to transmit to the UE 3320.

The UE 3320 removes the MAC header 690, the RLC header 680, the PDCP header 670, the SDAP header 660 and internal IP header 620 and forwards them to the DS-TT 3310.

The DS-TT 3310 forwards the TSN frame 610 to the TSN end station 3110.

Meanwhile, the addition and deletion of the header for the uplink data is the opposite to the case of the downlink data described above, so further description will be omitted.

Time information of when the NW-TT 3332 receives the time sensitive frame (hereinafter, referred to as time information of downlink time sensitive frame) is transmitted to the RAN 3330 through the GTP header 630. The RAN 3330 transmits the time information of the downlink time sensitive frame received by the GTP header 630 to the UE 3320 through the SDAP header 660. The UE 3320 transmits the time information of the downlink time sensitive frame to the DS-TT 3310. Here, the DS-TT 3310 may obtain a difference between the time information of the downlink time sensitive frame (that is, the time information of when the NW-TT3392 receives the time sensitive frame) and the time when the DS-TT 3310 transmits to the TSN end station 3110, and calculate a delay time (residence time) in the 5G network 3300. In particular, with respect to PTP data for transmitting clock A or clock B of FIG. 3 among the downlink data, the DS-TT 3310 may insert the calculated delay time into the correction field of PTP (Precision Time Protocol). The calculated value is used for the TSN end station 3110 to synchronize with the TSN system 3100.

In the case of uplink data, the DS-TT 3310 transmits the time information when the time sensitive frame is received (hereinafter, referred to as time information of uplink time sensitive frame) to the UE 3320. The UE 3320 transmits the time information of the uplink time sensitive frame to the RAN 3330 through the SDAP header 660, and the RAN 3330 transmits the time information of the uplink time sensitive frame transmitted by the SDAP header 660 to the NW-TT 3392 through the UPF 3360 using the GTP header 630. Here, the NW-TT 3392 may obtain a difference between the time information of the uplink time sensitive frame (that is, the time information when the DS-TT3310 receives the time sensitive frame) and the time when the NW-TT 3392 transmits to the TSN end station 3100, and calculate a delay time (residence time) in the 5G network 3300. In particular, with respect to PTP data for the time synchronization among the uplink data, the NW-TT 3392 may insert the calculated delay time into the correction field of the PTP (Precision Time Protocol). The calculated value is used for the TSN system 3100 to synchronize with the TSN end station 3110.

In case of the uplink time sensitive data, the UE 3320 adds one or more pieces of the time information shown in Table 1 below when adding the SDAP header 660.

In the case of the downlink time sensitive data, the UPF 3360 adds one or more pieces of the time information shown in Table 1 below when adding the GTP header 630. In the case of the uplink time sensitive data, the UE 3320, the RAN 3330, or the UPF 3360 may discard the corresponding time sensitive data if it cannot be delivered within the time at which it should be delivered. In the case of the downlink time sensitive data, the UPF 3360, the RAN 3330, or the UE 3320 may discard the corresponding time sensitive data if it cannot be delivered within the time at which it should be delivered.

TABLE 1

| | In case of uplink time sensitive data | In case of down time sensitive data |
|---|---|---|
| ① | A time when the DS-TT receives the time sensitive frame | A time when the NW-TT receives the time sensitive frame |
| ② | A time when the UPF should receive the time sensitive packet | A time when the UE should receive the time sensitive packet |
| ③ | A time when the TSN end station in TSN system should receive the time sensitive frame | A time when the TSN end station should receive the time sensitive frame |

Figure 7:
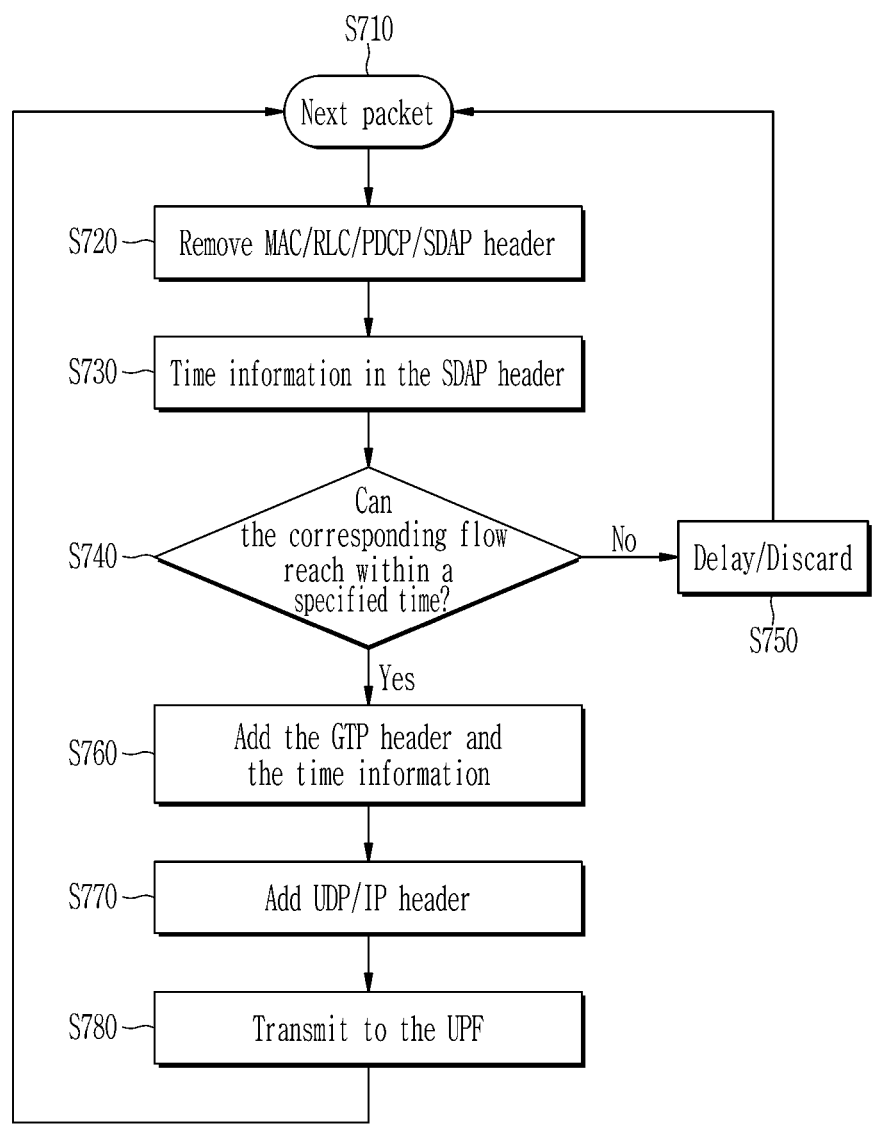
FIG. 7 is a flowchart showing an uplink packet processing method of the RAN according to an exemplary embodiment of the present invention.

FIG. 7 is a flowchart showing an uplink packet processing method of the RAN 3330 according to an exemplary embodiment of the present invention.

After checking the time information included in the SDAP 660 of the removed uplink data, the RAN 3330 determines whether the corresponding flow can reach the user (e.g., the TSN system 3100) within a specified time (S720, S730, S740). When the RAN 3330 determines that the flow cannot be reached within a specified time, the RAN 3330 may discard the corresponding data (packets) (S740, S750). When the RAN 3330 determines that the flow can be reached within the specified time, the RAN 3330 adds the GTP header 630, the UDP header 640, and the IP header 650 to transmit to the UPF 3360 (S760, S770, S780). Here, the RAN 3330 adds the time information included in the SDAP 660 into the GTP header 630 (S760).

Figure 8:
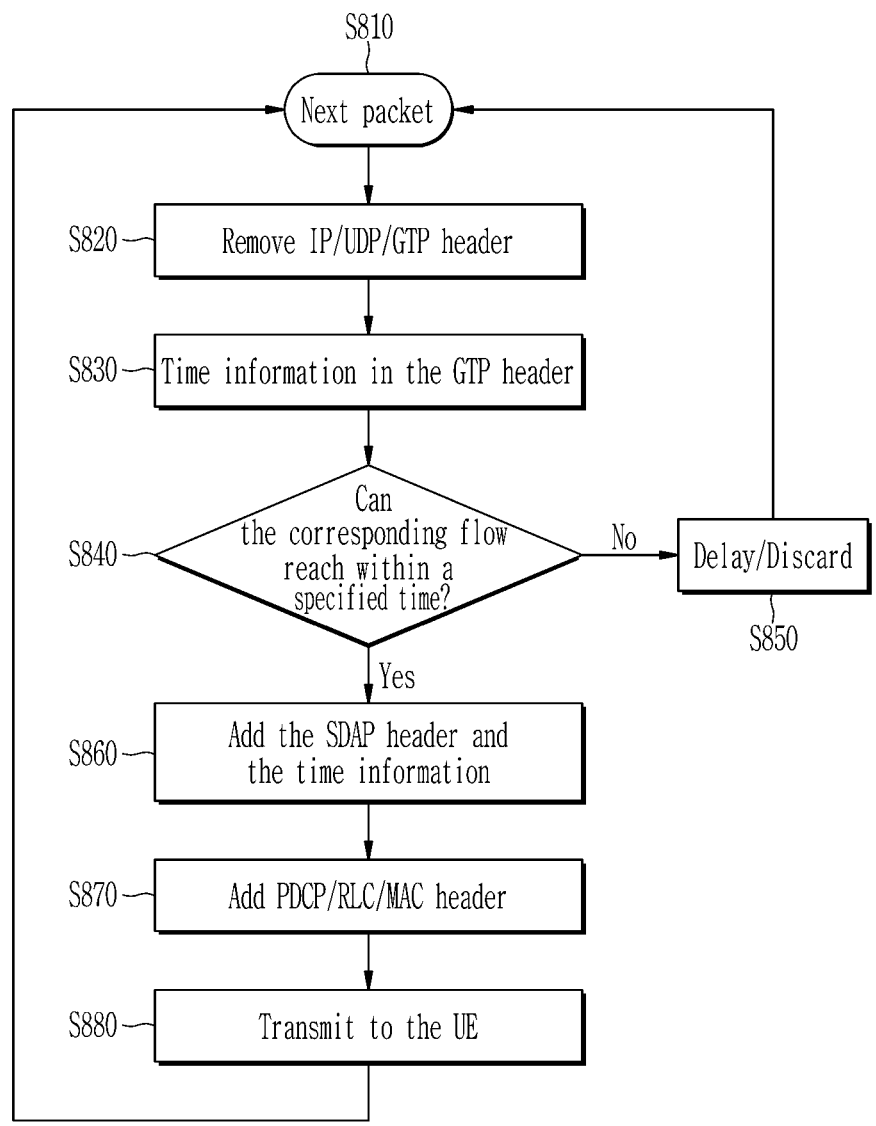
FIG. 8 is a flowchart showing a downlink packet processing method of the RAN according to an exemplary embodiment of the present invention.

FIG. 8 is a flowchart showing a downlink packet processing method of the RAN 3330 according to an exemplary embodiment of the present invention.

After checking the time information included in the GTP 630 of the downlink data, the RAN 3330 determines whether the corresponding flow can reach the user within a specified time (S820, S830, S840). When the RAN 3330 determines that the flow cannot be reached within a specified time, the RAN 3330 may discard the corresponding data (packets) (S840, S850). When the RAN 3330 determines that the flow can be reached within the specified time, the RAN 3330 adds the SDAP header 660, the PDCP header 670, the RLC header 680, and the MAC header 690 to transmit to the UE 3320 (S860, S870, S880). Here, the RAN 3330 adds the time information included in the GTP 630 into the SDAP header 660 (S860).

Figure 9:
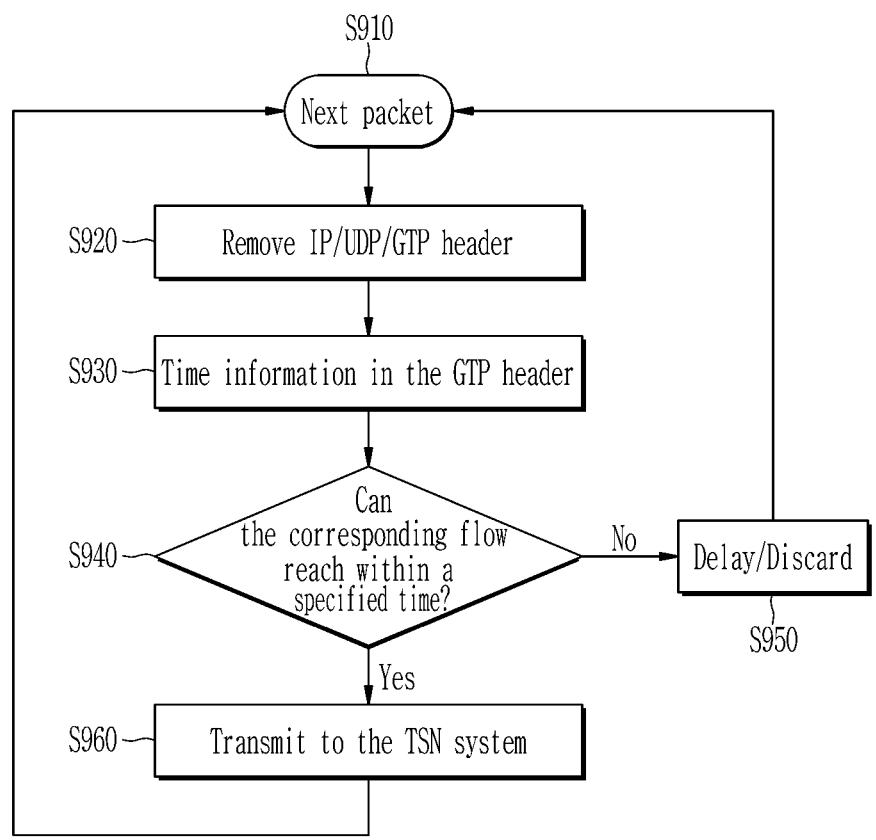
FIG. 9 is a flowchart showing an uplink packet processing method of the NW-TT or UPF including the NW-TT according to an exemplary embodiment of the present invention.

FIG. 9 is a flowchart showing an uplink packet processing method of the NW-TT 3392 or UPF 3360 including the NW-TT 3392 according to an exemplary embodiment of the present invention.

After checking the time information included in the GTP 630 of the uplink data, the NW-TT 3392 or UPF 3360 including the NW-TT 3392 determines whether the corresponding flow can reach the user (e.g., the TSN system 3100) within a specified time (S920, S930, S940). When the NW-TT 3392 or UPF 3360 including the NW-TT 3392 determines that the flow cannot be reached within the specified time, the NW-TT 3392 or UPF 3360 including the NW-TT 3392 may discard the corresponding data (packets) (S940, S950). When the NW-TT 3392 or UPF 3360 including the NW-TT 3392 determines that the flow can be reached within the specified time, the NW-TT 3392 or UPF 3360 including the NW-TT 3392 transmits the corresponding data (packets) to the TSN system 3100 (S940, S960).

Figure 10:
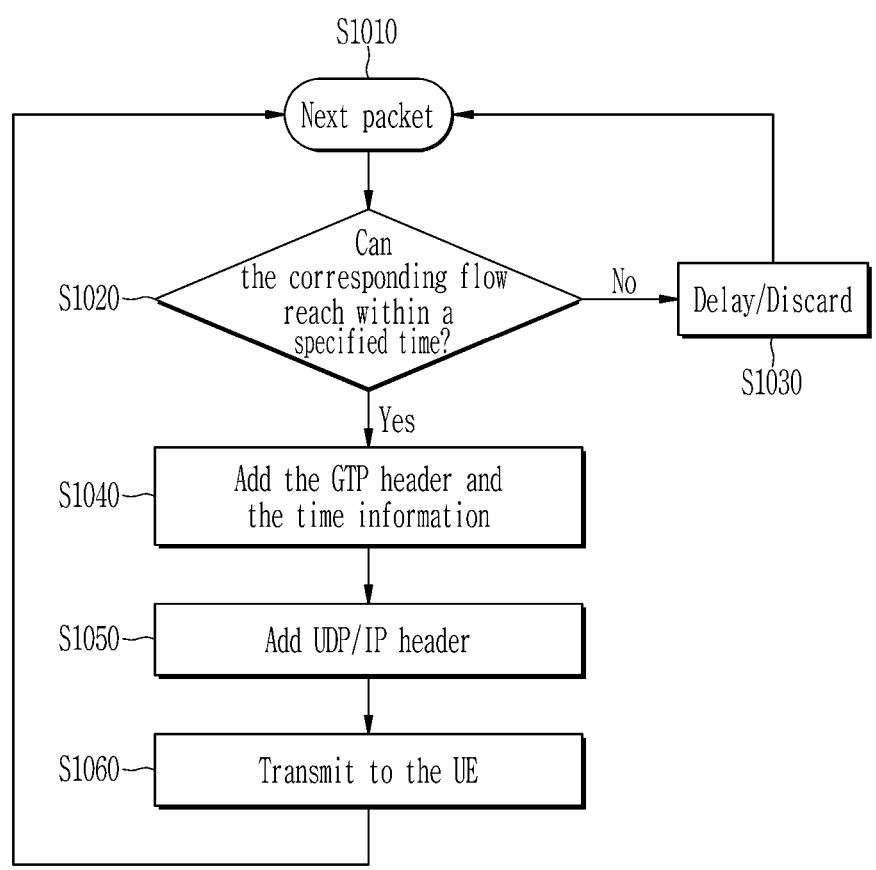
FIG. 10 is a flowchart showing a downlink packet processing method of the NW-TT or UPF including the NW-TT according to an exemplary embodiment of the present invention.

FIG. 10 is a flowchart showing a downlink packet processing method of the NW-TT 3392 or UPF 3360 including the NW-TT 3392 according to an exemplary embodiment of the present invention.

After checking the registered time information for the stream of downlink data, the NW-TT 3392 or UPF 3360 including the NW-TT 3392 determines whether the corresponding flow can reach the user within a specified time (S1020). When the NW-TT 3392 or UPF 3360 including the NW-TT 3392 determines that the flow cannot be reached within the specified time, the NW-TT 3392 or UPF 3360 including the NW-TT 3392 may discard the corresponding data (packets) (S1020, S1030). When the NW-TT 3392 or UPF 3360 including the NW-TT 3392 determines that the flow can be reached within the specified time, the NW-TT 3392 or UPF 3360 including the NW-TT 3392 adds the GTP header 630, the UDP header 640, and the IP header 650 to transmit to the UE 3320 (S1040, S1050, S1060). Here, the NW-TT 3392 or UPF 3360 including the NW-TT 3392 adds the time information into the GTP header 630 (S1040).

Meanwhile, whether or not the corresponding data described with reference to FIGS. 7 to 10 can be transmitted in time will be described in more detail with reference to FIG. 12. In order for the corresponding data to be delivered in the required transmission time (DminT, DMaxT) for each time sensitive stream, the UE 3320, the RAN 3330, or the UPF 3360 calculates and determines whether the corresponding data can be delivered when considering a minimum/maximum value of the L2 communication section and a time delay of (Dmin5, DMax5) time in the L3 communication section. Meanwhile, the RAN 3330 or the UPF 3360 may delay by (DminT-DMax5) according to the requirements of the stream when it is determined that the stream arrives faster than DminT even when the stream is delayed by DMax5.

Figure 11:
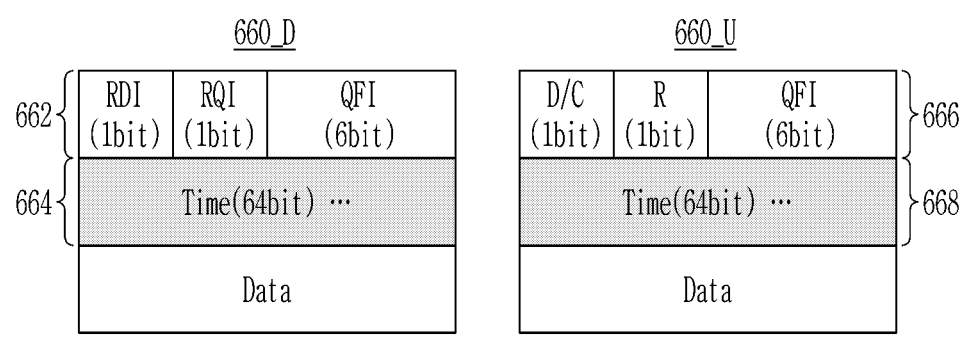
FIG. 11 is a diagram showing an SDAP header and its extension according to an exemplary embodiment of the present invention.

FIG. 11 is a diagram showing an SDAP header and its extension according to an exemplary embodiment of the present invention. In FIG. 11, 660_D represents downlink data including an SDAP header, and 660_U represents uplink data including an SDAP header.

The SDAP header is a header used for delivering QoS information between the RAN 3330 and the UE 3320. In an exemplary embodiment of the present invention, time information 664 and 668 is added to the SDAP header for the time sensitive data. As shown in FIG. 11, although the uplink SDAP header structure 662 and the downlink SDAP header structure 666 are different from each other, the method of adding time information is the same. Here, the additional time information 664 and 668 may be a natural time including the year, month, day, hour, minute, millisecond, microsecond, and nanosecond. The additional time information 664 and 668 may be expressed in the form of epoch time expressed as the number of clock ticks that have elapsed since a specific reference time point. In FIG. 11, 662 is a general SDAP header used for downlink and includes a reflective QoS flow to DRB mapping indication (RDI), a reflective QoS indication (RQI), and a QoS flow ID (QFI). In addition, 666 is a general SDAP header used for uplink, and includes a D/C (Data/Control), an R (Reserved), and a QFI (QoS Flow ID). Time information 664 and 668 is added to this general SDAP header.

Here, the time information 664 and 668 may be one or more of the three types described in Table 1 above. In the case of the downlink data, the time information 664 may be any of a time when the NW-TT 3392 receives the time sensitive frame, a time when the UE 3320 should receive the time sensitive packet, and a time when the TSN end station 3110 should receive the time sensitive frame. In the case of the uplink data, the time information 668 may be any of a time when the DS-TT 3310 receives the time sensitive frame, a time when the UPF 3360 should receive the time sensitive packet, and a time when the TSN end station in the TSM system 3100 should receive the time sensitive frame. Herein, ② and ③ of Table 1 may be expressed as the maximum time/minimum time described in FIG. 12 below.

Figure 12:
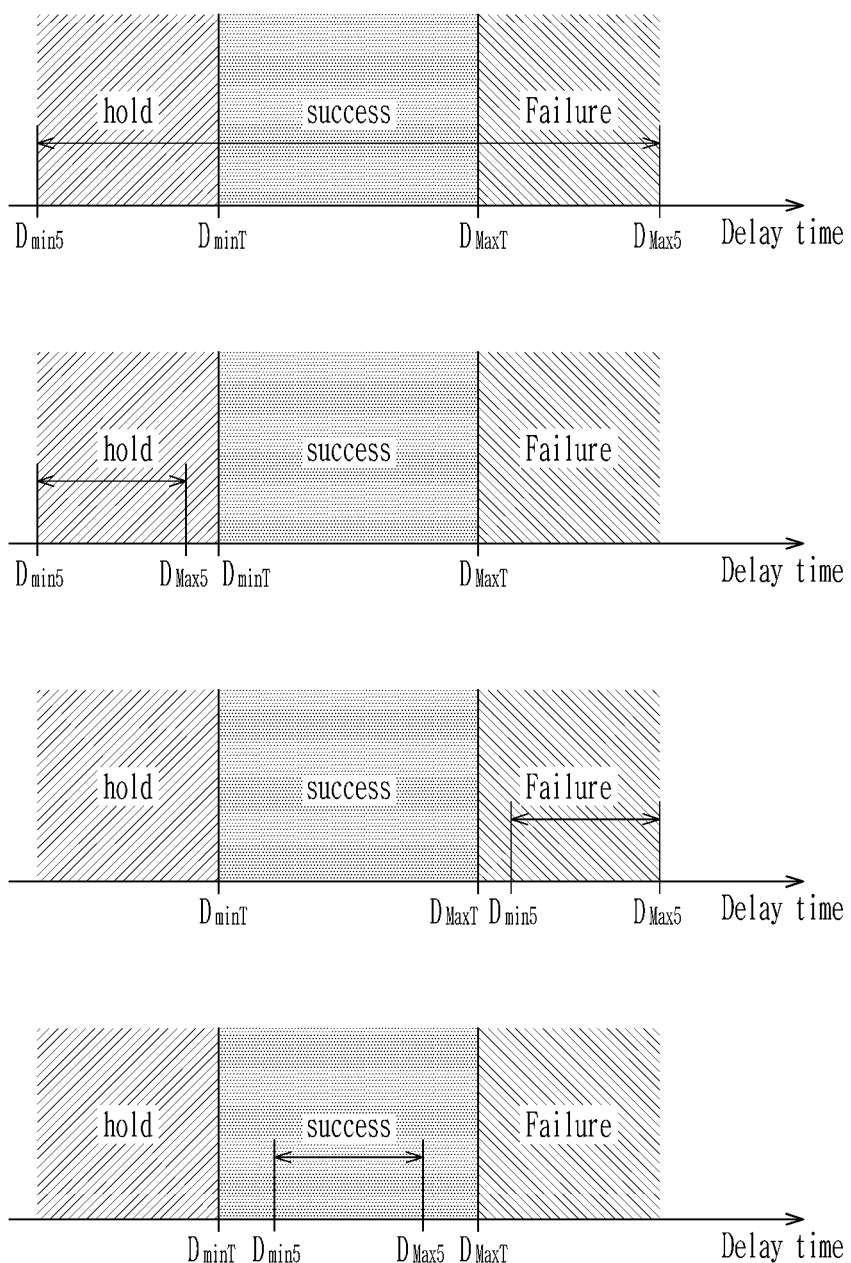
FIG. 12 is a diagram showing time representation of time sensitive data according to an exemplary embodiment of the present invention.

FIG. 12 is a diagram showing a time representation of time sensitive data according to an exemplary embodiment of the present invention.

The time sensitive frame from TSN system 3100 needs to be delivered to the TSN end station 3110 within a certain delay time. It is assumed that the minimum and maximum values of the time required for the transmission (deliver) are DminT and DmaxT. On a basis of the downlink data, if the time when the NW-TT 3392 receives the time sensitive frame is called T, the time sensitive frame needs to be delivered (transmitted) to the TSN end station 3110 from T+DminT to T+DmaxT. Meanwhile, it is assumed that the minimum/maximum values of delay times that time sensitive packet can be transmitted from the UPF 3360 to the UE 3320 according to the situation in the 5G network 3300 are Dmin5 and Dmax5, respectively. Here, the transmission time between the UE 3320 and the TSN end station 3110 and the transmission time between the NW-TT 3392 and the UPF 3360 are considered and treated as the same for convenience. In this case, the 5G network 3300 may transmit (deliver) the time sensitive packet to the TSN end station 3110 between T+Dmin5 and T+DMax5.

FIG. 12 shows the combination of Dmin5 and Dmax5 for these DminT and DMaxT. If the maximum/minimum (DminT, DMaxT) range of TSN data falls within the maximum/minimum (Dmin5, DMax5) range of delay that the 5G network 3300 can provide for delivery of TSN data, the DminT to DMaxT interval is a valid transmission (Success), and the rest of the interval is an invalid transmission (Failure). In this case, when Dmin5 and Dmax5 are smaller than DminT, the time sensitive packet may be hold by DminT-DMax5. When Dmin5 and DMax5 are larger than DMaxT, the time sensitive packet may be discarded.

Figure 13:
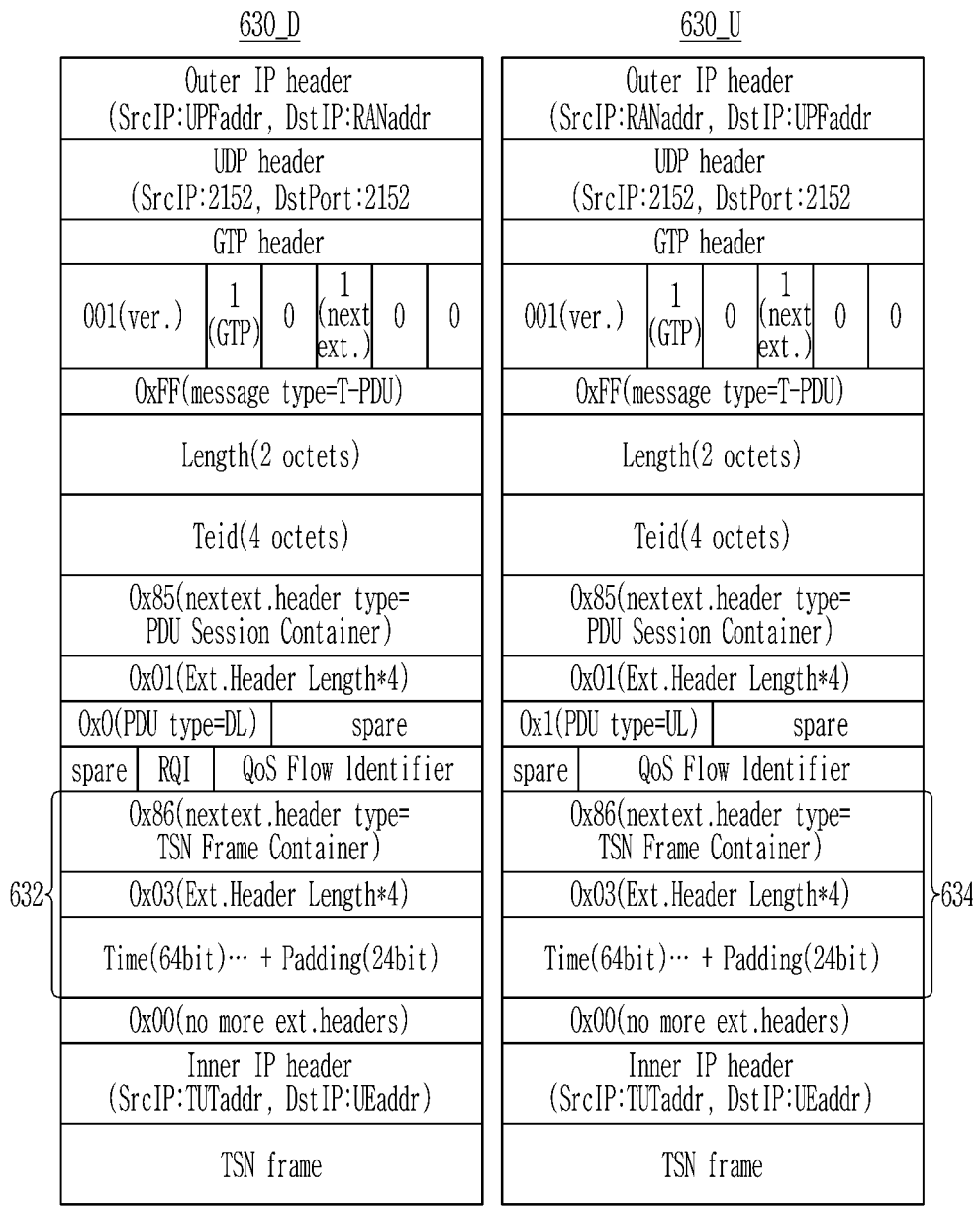
FIG. 13 is a diagram showing a GTP header and its extension according to an exemplary embodiment of the present invention.

FIG. 13 is a diagram showing a GTP header and its extension according to an exemplary embodiment of the present invention. In FIG. 13, 630_D represents downlink data including a GTP header, and 630_U represents uplink data including a GTP header.

The GTP header is a header used for data transmission between the RAN 3330 and the UPF 3360. In an exemplary embodiment of the present invention, time information 632 and 624 is added to the GTP header for the time sensitive data. As shown in FIG. 13, although the uplink GTP header structure and the downlink GTP header structure are different from each other, the method of adding time information is the same. The addition of the time information to the GTP header uses an extension, and 632 and 634 of FIG. 13 are added.

For example, the extension header type is set to an arbitrary value such as 0x86, and a header length is inserted. Since the header length has a meaning of (an actual byte including the header length) *4, padding is added so that the time information is added and the remaining area is a multiple of four.

Here, the additional time information 632 and 634 may be a natural time including the year, month, day, hour, minute, millisecond, microsecond, and nanosecond. The additional time information 632 and 634 may be expressed in the form of epoch time expressed as the number of clock ticks that have elapsed since a specific reference time point. Here, the time information 632 and 634 may be one or more of the three types described in Table 1 above. In the case of the downlink data, the time information 632 may be any of a time when the NW-TT 3392 receives the time sensitive frame, a time when the UE 3320 should receive the time sensitive packet, and a time when the TSN end station 3110 should receive the time sensitive frame. In the case of the uplink data, the time information 634 may be any of a time when the DS-TT 3310 receives the time sensitive frame, a time when the UPF 3360 should receive the time sensitive packet, and a time when the TSN end station in the TSM system 3100 should receive the time sensitive frame. Herein, ② and ③ of Table 1 may be expressed as the maximum time/minimum time described in FIG. 12.

As described above, according to the exemplary embodiment of the present invention, the corresponding data may be delivered within the required time by indicating the delivery (transmission) time for the time sensitive data of the TSN. If the data cannot be delivered within the required time, it may be discarded.

Figure 14:
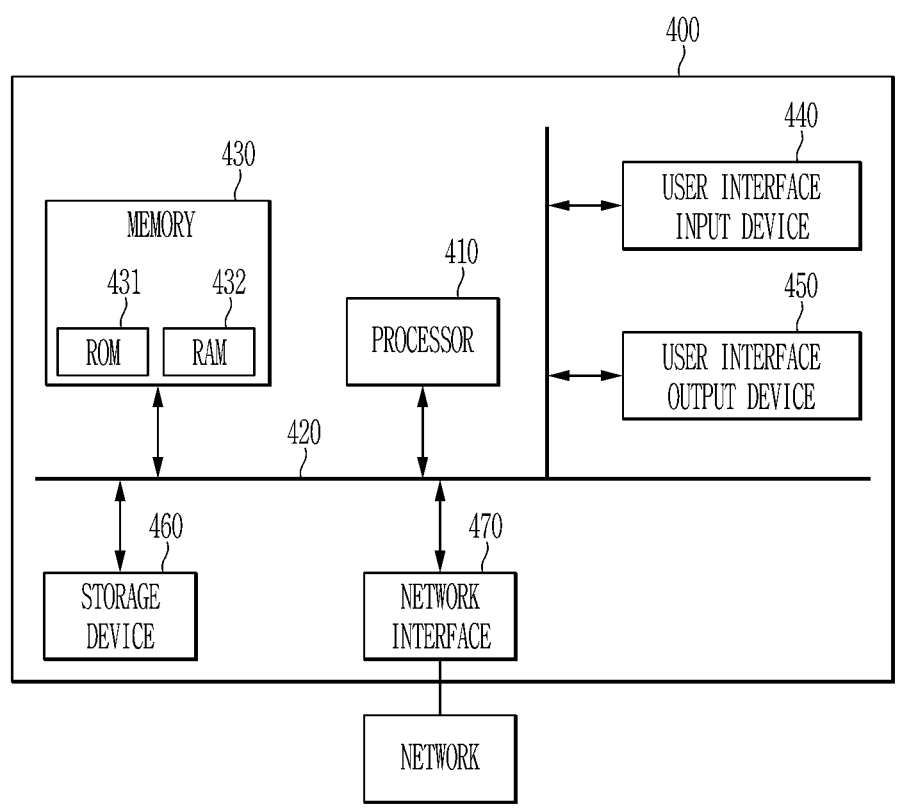
FIG. 14 is a diagram showing a computing system according to an exemplary embodiment of the present invention.

FIG. 14 is a diagram showing a computing system according to an exemplary embodiment of the present invention.

The computing system 400 of FIG. 14 may be the network element described with reference to FIGS. 1 and 3. That is, the computing system 400 may be the TSN end station, the TSN bridge, and the each component of the 5G network described with reference to FIGS. 1 and 3. Such network elements may be implemented as a computer system, for example, a computer readable medium.

The computer system 400 includes at least one of a processor 410, a memory 430, a user interface input device 440, a user interface output device 450, and a storage device 460, that communicate via a bus 420. The computer system 400 may also include a network interface 470 coupled to a network. The network interface 470 may transmit or receive signals with other network elements over the network.

The processor 410 may be a central processing (CPU) or a semiconductor device that executes instructions stored in the memory 430 or the storage device 460. The processor 410 may be configured to implement the functions, methods, and formats described with reference to FIGS. 1 to 13.

The memory 430 and the storage device 460 may include various forms of volatile or non-volatile storage media. For example, the memory 430 may include a read only memory (ROM) 431 and a random access memory (RAM) 432. In an exemplary embodiment of the present invention, the memory 430 may be located inside or outside the processor 410, and the memory 430 may be coupled to the processor 410 through various already-known means.

It should be understood that the exemplary embodiments disclosed herein are merely illustrative and are not intended to limit the scope of the invention. It will be apparent to one of ordinary skill in the art that various modifications of the exemplary embodiments may be made without departing from the spirit and scope of the claims and their equivalents.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for processing a packet in a time-synchronized network, the method comprising:

receiving, by a first network element, a first data packet to be transmitted to a second network element via a third network element;

adding, by the first network element, a header to the first data packet;

adding, by the first network element, time information associated with the first data packet to the header; and transmitting, by the first network element, the first data packet with the header to the third network element, wherein the time information includes a first time when the first network element receives the first data packet, the header is a general packet radio service tunneling protocol (GTP) header, and the first data packet includes a time sensitive data frame to be transmitted at a data link layer using an unstructured frame.

2. The method of claim 1, wherein the time information further includes at least one of a second time when the third network element should receive the first data packet and a third time when the first data packet should be delivered to the second network element.

3. The method of claim 2, wherein the third network element calculates a time spent passing from the first network element to the third network element by using a difference between a time when the first network receives the first data packet and a time when the third network element transmits the first data packet.

4. The method of claim 3, wherein the third network element puts the spent time into a correction field of a precision time protocol (PTP).

5. The method of claim 2, wherein the third time is represented using a minimum time at which the first data packet should be delivered to the second network element and a maximum time at which the first data packet should be delivered to the second network element.

6. The method of claim 2, wherein the third time is represented using a minimum time that a network can occupy for delivering the first data packet to the second network element and a maximum time that a network can occupy for delivering the first data packet to the second network element.

7. The method of claim 2, wherein the first to third times are one of a natural time and an epoch time.

8. The method of claim 1, wherein the adding the first time information includes creating, by the first network element, an extension indicating a time in the GTP header and recording the time information in the extension.

9. The method of claim 1, wherein the time sensitive data frame is a precision time protocol (PTP) frame.

10. The method of claim 1, wherein:

the first network element is a NW-TT (network TSN (time sensitive networking) translator) or a UPF (user plane function), the third network element is user equipment or a DS-TT (device side TSN translator), and the second network element is a TSN end station.

11. The method of claim 1, wherein:

the first network element is a DS-TT (device side TSN (time sensitive networking) translator) or user equipment, the third network element is a UPF (user plane function) or a NW-TT (network TSN translator), and the second network element is a TSN end station.

12. A first network element for processing a packet in a network, the first network element comprising:

a network interface configured to receive a first data packet to be transmitted to a second network element via a third network element; and a processor configured to add a header including time information associated with the first data packet to the first data packet and control transmitting the first data packet with the header to the third network element, wherein the time information includes a first time when the first network element receives the first data packet, the header is a general packet radio service tunneling protocol (GTP) header, and the first data packet includes a time sensitive data frame to be transmitted at a data link layer using an unstructured frame.

13. The first network element of claim 12, wherein the time information further includes at least one of a second time when the third network element should receive the first data packet and a third time when the first data packet should be delivered to the second network element.

* * * * *